(12) United States Patent
Lacroix

(10) Patent No.: US 6,405,933 B1
(45) Date of Patent: Jun. 18, 2002

(54) CONTROL DEVICE FOR A SYSTEM FOR DISTRIBUTING AN AIRFLOW IN A VEHICLE

(75) Inventor: Louis Lacroix, Champigny S/Marne (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/969,661

(22) Filed: Oct. 4, 2001

(30) Foreign Application Priority Data

Oct. 17, 2000 (FR) .............................. 00 13272

(51) Int. Cl.⁷ ................................ B60H 1/02
(52) U.S. Cl. .................... 237/12.3 R; 701/36
(58) Field of Search ............... 237/5, 12.3 R, 237/12.4; 701/36; 236/1 E

(56) References Cited

U.S. PATENT DOCUMENTS 3,971,454 A * 7/1976 Waterbury .................. 136/291
4,591,153 A * 5/1986 Krey .......................... 180/90
4,656,877 A * 4/1987 Hildebrand et al. ... 237/12.3 R
6,115,657 A   9/2000 Petit

FOREIGN PATENT DOCUMENTS

| DE | 196 10 148 A1 | 9/1997 |
| DE | 297 15 671 U1 | 12/1997 |
| FR | 1 447 250 A | 11/1966 |
| FR | 2 782 299 A | 2/2000 |

* cited by examiner

Primary Examiner—Harold Joyce
Assistant Examiner—Derek S. Boles
(74) Attorney, Agent, or Firm—Liniak, Berenato, Longacre & White

(57) ABSTRACT

The invention relates to a mechanical control device (10) making it possible to act on control members of an airflow-distribution system (1) for a motor vehicle, characterised in that it comprises at least two separate control means (30, 40) with rotary movement acting respectively independently with respect to one another on the control members, a first control means (30) being mounted turning about a first rotational axis and carrying a second control means (40) mounted turning about a second rotational axis which is inclined with respect to the first rotational axis.

20 Claims, 8 Drawing Sheets

CONTROL DEVICE FOR A SYSTEM FOR DISTRIBUTING AN AIRFLOW IN A VEHICLE

FIELD OF THE INVENTION

The present invention relates to a control device for a system for distributing an airflow of a motor vehicle, which is more particularly suitable for a heating or air-conditioning installation.

BACKGROUND OF THE INVENTION

In the present-day vehicles, the space reserved on the dashboard for controls in general is more and more constricted since provision is always being made for installing new equipment such as compact-disc players or, more recently, combinations of the radio/compact-disc player/satellite-guidance system type. However, the devices for control of functions such as the demisting, the ventilation or air-conditioning are vital for the comfort and the safety of the passengers. These controls therefore have to be easily accessible, offer ease of handling and be easily identifiable whilst taking up the least possible amount of space. The sophistication of these ventilation systems, moreover, has increased the possible number of functions, and has therefore complicated their control.

One solution to this problem has already been proposed in the patent FR 1 447 250. This solution consists in using a single control making it possible to set up the intensity, the temperature and the sharing of the throughput of an airflow sent into the passenger compartment of the vehicle. To do that, recourse is had to a single control handle provided on the end of a stalk which can slide from front to rear (opening or closing of the demisting for example), turn about its own axis (adjustment of the temperature) and pivot in a vertical axis perpendicular to the axis of the stalk (adjustment of the throughput).

However, not only is this solution not at all aesthetic, but it additionally requires large amplitudes in the movements of the stalk, especially for its axial translation and its rotation in the vertical axis. This therefore means reserving a lot of space in the dashboard, and especially a fairly substantial and ungainly horizontal cut-out. Moreover, the combination of a translational movement and of two rotational movements makes the device more fragile and very complicated to manipulate. Finally, because of the possible combination of the various movements and of the use of cables, the movements of the stalk are not really independent of one another. For example, by pivoting the stalk around the vertical axis in order to adjust the throughput, it is also possible to cause a slight action on the cable for the temperature adjustment whenever a support plate for this cable is made to turn. It will therefore be understood that, in this field, many improvements may be made.

SUMMARY OF THE INVENTION

The object of the present invention is therefore to resolve these problems at least partly by proposing a solution which is simple to implement, easy to use, compact, aesthetic (possible integration into numerous dashboards) and inexpensive.

To that end, the invention relates to a mechanical control device making it possible to act on control members of an airflow-distribution system for a motor vehicle, characterised in that it comprises at least two separate control means with rotary movement acting respectively independently with respect to one another on the control members, a first control means being mounted turning about a first rotational axis and carrying a second control means mounted turning about a second rotational axis which is inclined with respect to the first rotational axis.

The second control means is preferably articulated onto the first control means and turns about the second rotational axis which is perpendicular to the first rotational axis.

In particular, the first control means is a central knob equipped with a slot and the second control means is articulated in the said slot.

Advantageously, the second control means will feature means for transmitting a translational movement, by turning about the second rotational axis, along the first axis to a rod which features means for converting this translational movement into a rotational movement about a third rotational axis perpendicular to the first axis, this rotational movement being transmitted to a lateral control piece.

In particular, the second control means could be a knurled wheel which will then feature, internally, a straight-toothed-wheel portion turning about the second rotational axis so as to act on a straight-toothed rack gear extending along the first axis and integral with the rod, the said rod being equipped, furthermore, at the opposite end to the rack gear, with a succession of parallel grooves which act axially like teeth in engagement with a toothed wheel of the lateral control piece.

According to another aspect of the invention, the rotary central knob is linked to one end of a first shaft turning about the first rotational axis, this shaft featuring means for converting its rotational movement into another rotational movement about a fourth rotational axis perpendicular to the first axis so as to cause a first control lever to turn.

In particular, the first shaft of the control knob is equipped, at its opposite end, with a conical gear in engagement with a conical toothed-wheel portion of the first control lever.

In the concern for optimisation of the integration of the controls, the rod is hollow and surrounds the first shaft of the central knob so as to be able to slide axially outside this shaft along the first rotational axis.

Still with a concern for optimisation of the number of pieces present in the mechanism, the central knob internally features two lugs, spaced apart and parallel to the first rotational axis, these lugs each being traversed by a hole with its axis perpendicular to the first axis so as to accommodate an internal tubular part of the knurled wheel for the articulation of the latter about the second rotational axis.

In a variant, the central knob could feature two lugs spaced apart and parallel to the first rotational axis, these lugs then being equipped with protuberances interacting with a tubular part of the knurled wheel for the articulation of the latter about the second rotational axis.

In order to transmit the rotational movement of the central knob to the first shaft, the latter is equipped axially, at its end for linking to the central knob, with a notch defining a link with the tubular part of the knurled wheel.

In order to be able to shift the knurled wheel in any position of the central knob, the said knurled wheel also features means for rotationally driving the rod by way of the rack gear.

In particular, these means consist of two parallel walls extending along the first rotational axis and situated in the immediate vicinity of the toothed wheel so as to surround the rack gear on either side, acting as a lateral drive abutment.

Still with a concern for integration of the controls, the device further comprises a third control means arranged around the first means and movable in rotation about the first rotational axis.

In particular, this third control means consists of an outer ring turning about the first rotational axis and equipped with means for causing a second shaft to turn about a fifth rotational axis parallel to the first axis, this shaft featuring means for converting its rotational movement into another rotational movement about a sixth rotational axis perpendicular to the first axis XI so as to cause a second control lever to turn.

The ring preferably features a straight-pinion portion arranged on its outer periphery and the teeth of which are in engagement with a straight gear mounted at one end of the second shaft, the said shaft, at its other end, featuring a worm screw acting on a straight toothed-wheel portion of the second control lever.

According to other characteristics of the invention:

the first control means acts on the spatial location of the airflow;

the second control means acts on the temperature of the airflow;

the third control means acts on the power of the airflow;

the control means and the control members are produced from plastic.

BRIEF DESCRIPTION OF THE DRAWINGS

The invention will be better understood, and other characteristics, details and advantages of it will emerge more clearly on reading the description which follows, given by way of example by reference to the attached drawings, in which.

DESCRIPTION OF THE PREFERRED EMBODIMENTS

Figure 1:
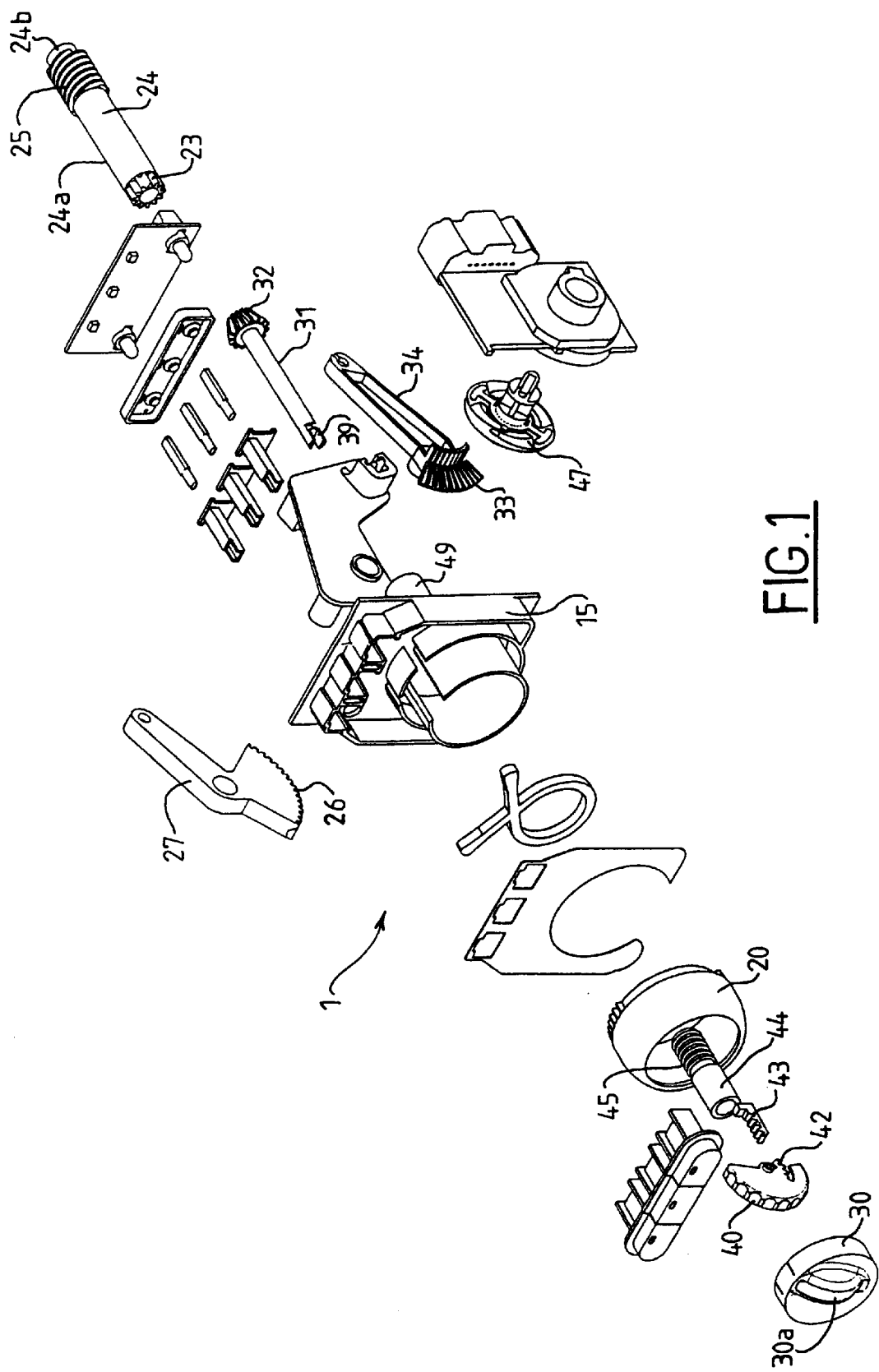
FIG. 1 is an overall view, in exploded perspective, of a control system for a motor-vehicle ventilation or air-conditioning device.

In FIG. 1, a mechanical control system 1 for motor-vehicle air-conditioning is seen represented, this system, in particular, being mounted on a dashboard (not represented) in such a way that at least some of its elements are accessible from the passenger compartment of the vehicle.

Overall, this system comprises a control device 10 associated with a group 110 of control members. For simplicity, it will be said that the control device 10 is visible and directly accessible from the passenger compartment so as to be manipulated by a passenger, while the control members constitute the kinematics proper of the system 1 and are therefore situated behind the dashboard which masks them.

The control device 10 comprises three control means. It consist of an outer ring 20, turning about a first axis X1, a central knob 30 concentric with the ring 20 and also turning about the axis X1, and a knurled wheel 40 mounted in a vertical slot of the central knob 30 and turning about a second axis X2 perpendicular to the first axis X1.

It should be noted that this slot could adopt any other orientation, subject to the knurled wheel remaining easy to use.

In this preferred embodiment, the knurled wheel 40 acts on the power of the airflow propelled by a blower or a motor-driven fan unit (not represented), the central knob 30 acts on the temperature of the airflow and the outer ring 20 acts on the spatial distribution (feet, head/torso, demisting) of the airflow.

Figure 2:
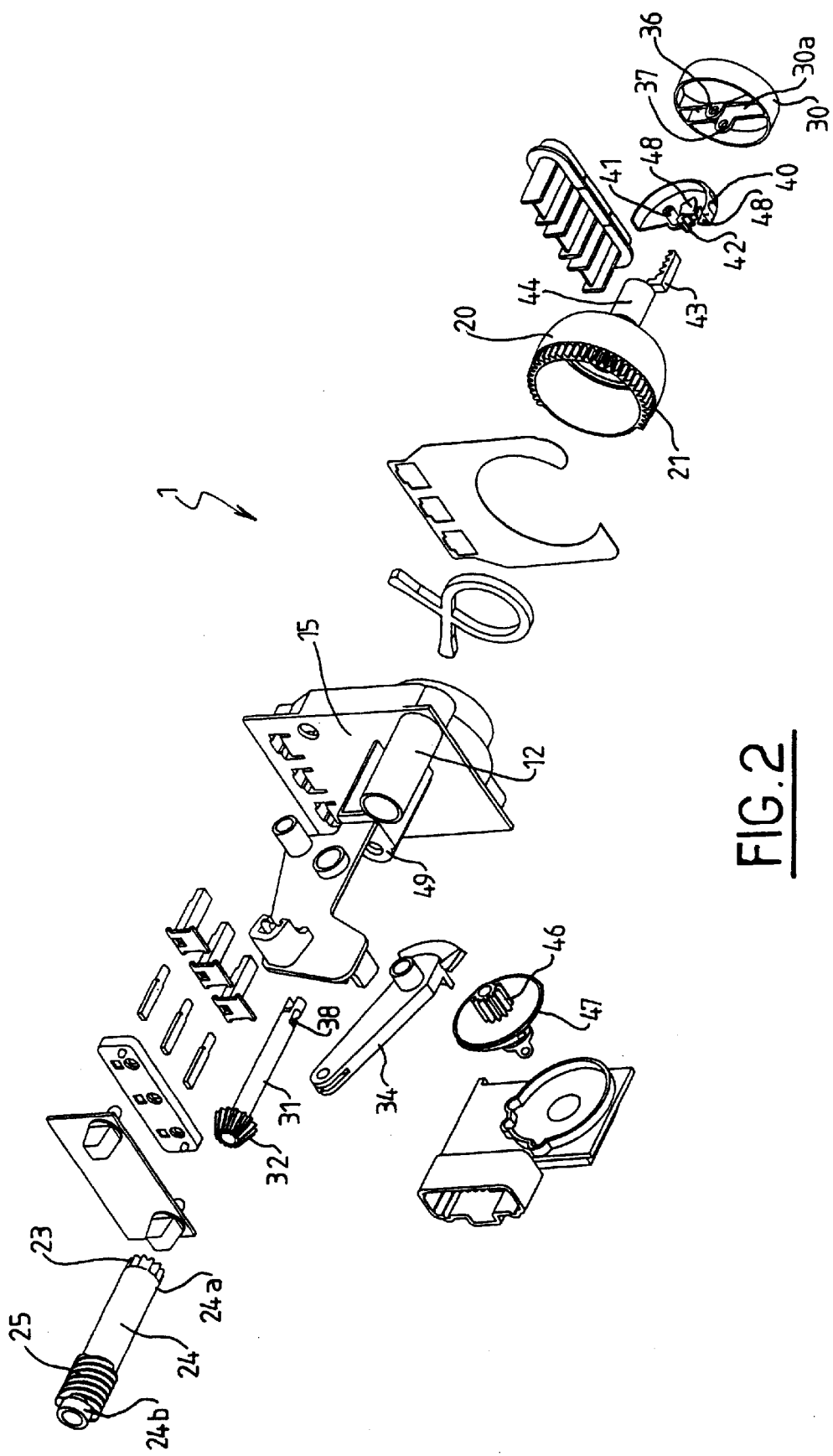
FIG. 2 is a view similar to FIG. 1 but taken from another angle.
Figure 3:
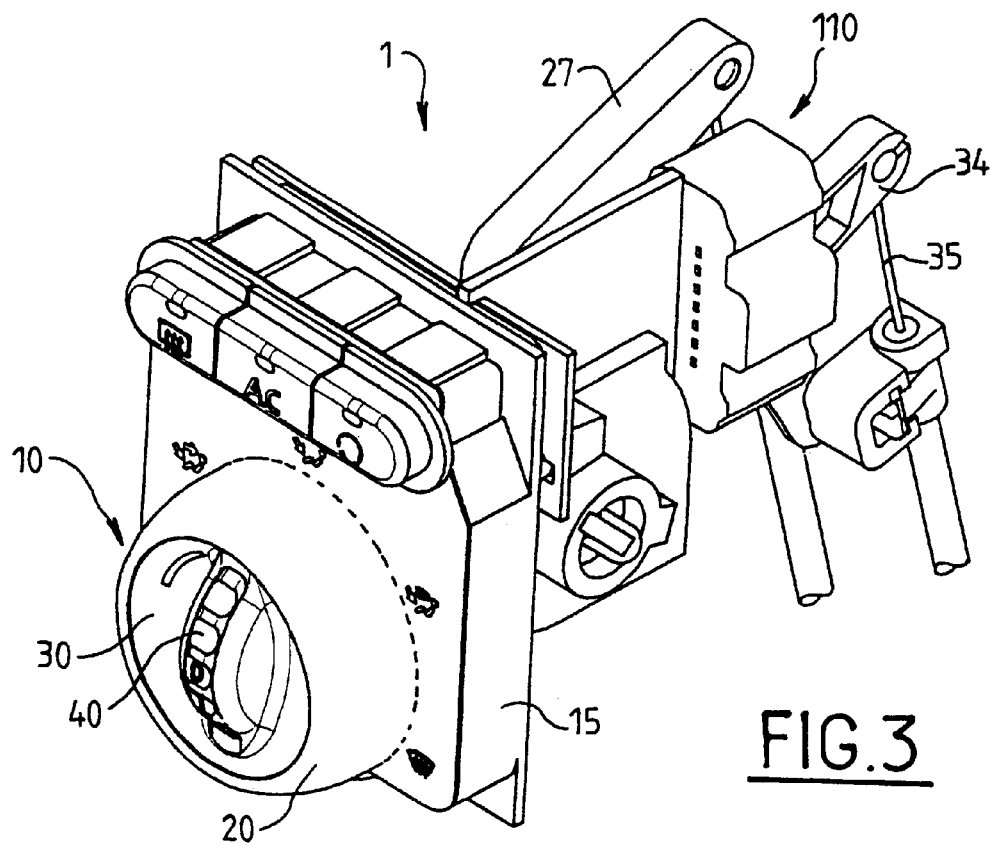
FIG. 3 is a view similar to FIG. 1, but with the elements fitted together.
Figure 4:
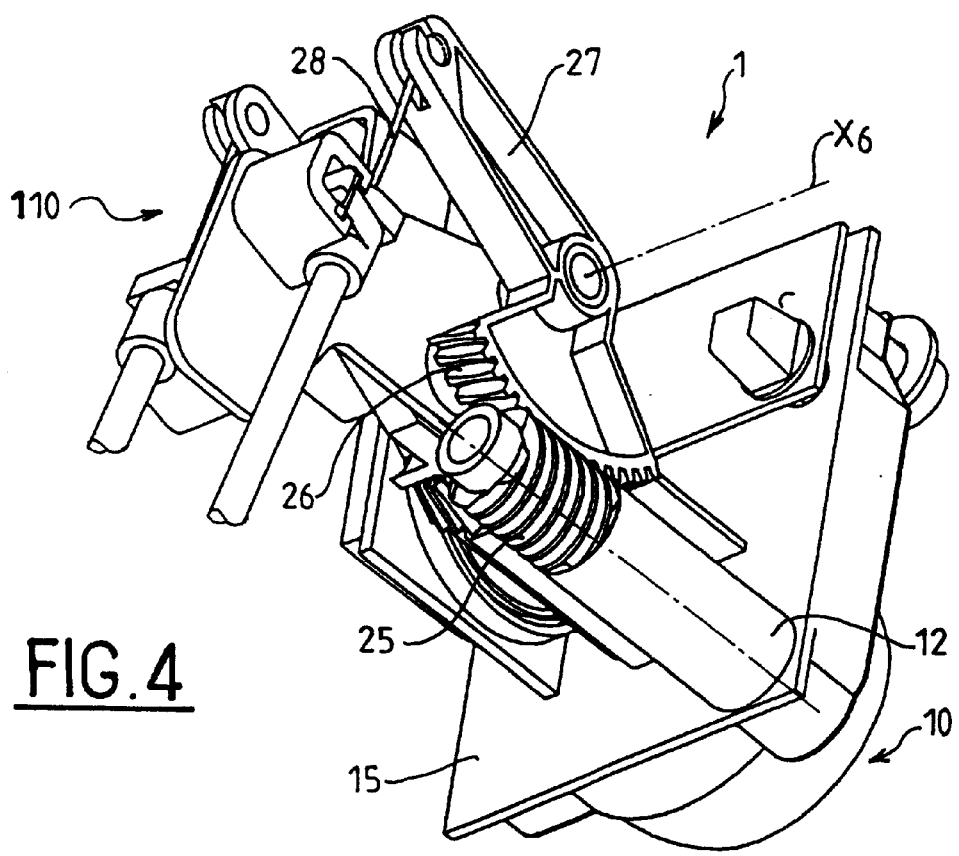
FIG. 4 is a view similar to FIG. 2 but with the elements fitted together.

As will be described later, these three control means are independent of one another in their operation. Thus, when they are manipulated in rotation, they each control their own control member without acting on the other members, even though two of the control means are linked mechanically as will be seen later on. There is therefore no mechanical "interference" between the three control means, even though they are assembled together into a single unit which could be called multi-function integrated actuator and which is seen better in FIGS. 2, 3 and 12.

Figure 7:
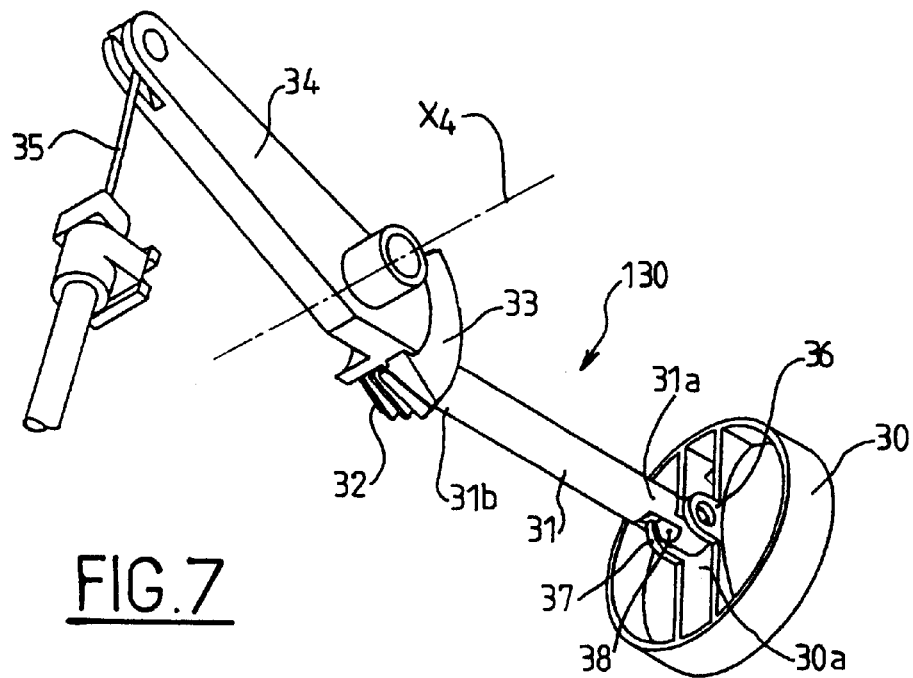
FIG. 7 is a detailed view in perspective of another control means.

FIG. 7 first of all shows the central knob 30 and its control member 130. This knob 30, concentric with the ring 20, can turn about the first axis X1 so as to act on the temperature of the airflow (for example hot to the left and cold to the right). It is linked to one end 31a of a first shaft 31 also mounted so as to rotate about the first axis X1. The link will be explained later on in connection with the knurled wheel 40. This first shaft 31 is terminated, at its opposite end 31b, by a conical gear 32 in engagement with a conical gearwheel 33 portion of a first control lever 34 (see also FIG. 1), the said wheel 33 turning about a fourth axis of rotation X4 perpendicular to the first axis.

Figure 8:
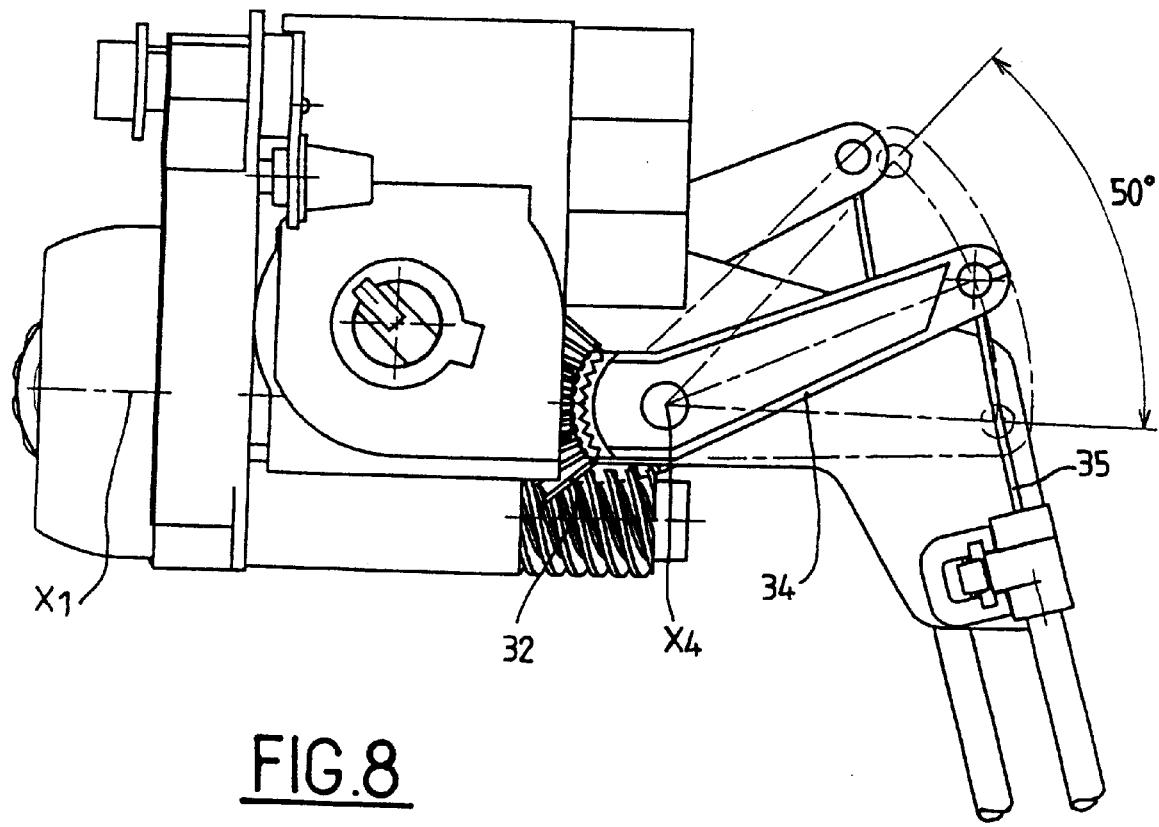
FIG. 8 is a right-hand-side view of FIG. 7.

Thus, as can also be seen in FIG. 8, by turning the central knob 30, the first shaft 31 is made to turn about the first axis X1. This shaft 31 causes the toothed wheel 33 of the first control lever 34 to turn about the fourth axis X4, the said lever then acting, via a rod linkage 35 provided for this purpose, for example on flaps (not represented) which handle the mixing of the hot air and of the cold air.

It should be noted that the conical gear 32 and the conical-wheel portion 33 can be replaced by any other similar kinematics, such as a system with straight pinions or with cams.

As can be seen in FIG. 8, the angular range of travel of the first lever is of about 50°, since the central knob turns only over about 150° (ratio substantially equal to 3:1 between the conical gearing of the first shaft and the toothed wheel of the lever).

Figure 9:
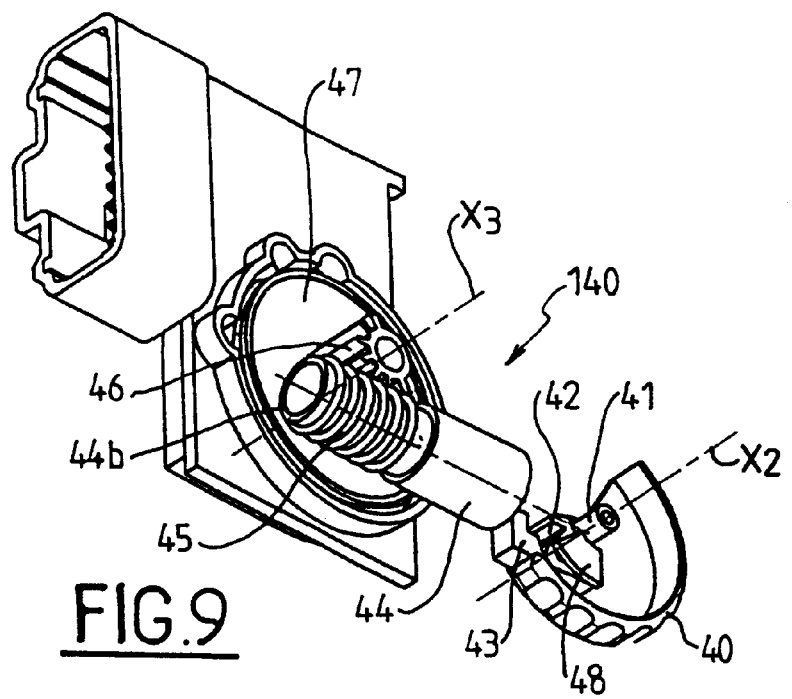
FIG. 9 is a detailed view in perspective of another control means.

FIG. 9 next shows the knurled wheel 40 mounted in a vertical slot 30a of the central knob 30, and its control member 140.

Figure 12:
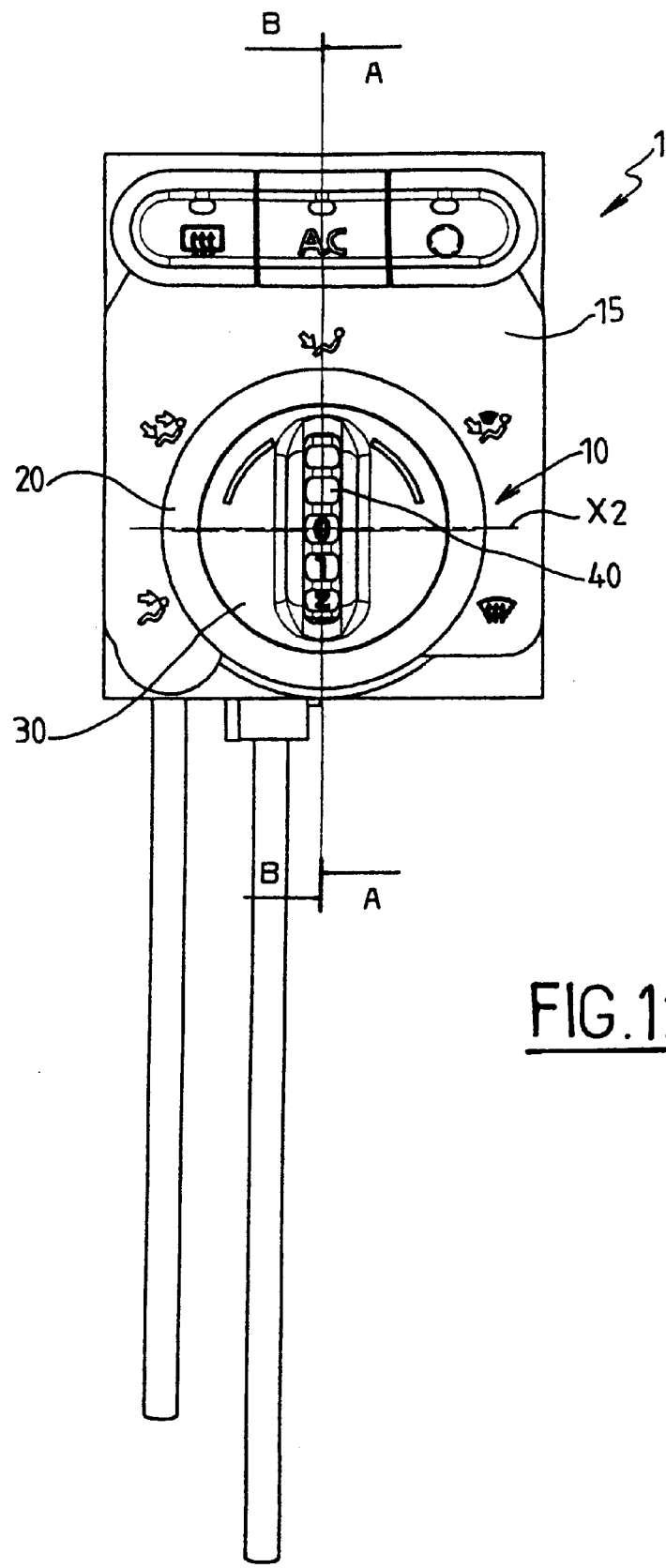
FIG. 12 is another front view of the system.

This knurled wheel 40 can turn about the second rotational axis X2 so as to act on the power of the airflow indicated by the numbers (0 to 4) of FIG. 12. This knurled wheel 40 is slightly ribbed externally for easier handling. It features a rotational axis physically represented by a tubular part 41 which is placed in two orifices of two lugs 36/37 (see FIGS. 2 and 7) of the central knob 30. This tubular part 41 serves, moreover, as a rotational link between the first shaft 31 and the knurled wheel 40, as can be seen very well in FIGS. 13 and 14. To that end, the first shaft 31 features an axial notch defining two claws 39 surrounding the tubular part 41 so as to form the link.

It should be noted that, for the articulation of the knurled wheel 40 on the central knob 30, it is possible to replace the tubular part 41 inserted into the two orifices of the lateral lugs 36/37 (see FIGS. 2 and 7) by lugs equipped with protrusions with axis X2 being inserted into a hollow tubular part 41 of the knurled wheel.

The knurled wheel 40 also, internally, features a straight toothed-wheel portion 42 which can turn about the second rotational axis X2 and which is in engagement with a straight rack gear 43 extending along the first rotational axis X1. This rack gear 43 is integral with a hollow rod 44 with axis X1 which, at its end 44b opposite to the rack gear 43, features a succession of reductions and of increases in diameter, all identical, physically embodied, for example, as several grooves 45 which are regularly spaced axially. On these grooves 45 a lateral wheel 46 with straight toothing engages, this wheel 46 belonging to a lateral piece 47 being, for example, linked to a system (not represented) making it possible to vary the power of the airflow.

Thus, by turning the knurled wheel 40 (FIGS. 10 and 11), the toothed wheel 42 is made to turn, which causes the hollow rod 44 to advance or retreat along the axis X1 by virtue of the rack gear 43. This hollow rod 44 in its turn causes the lateral piece 47 to turn about a third rotational axis X3 perpendicular to the first axis by way of the grooves 45 and of the toothed wheel 46.

It should be noted that the straight wheel portion 42 and the rack gear 43 can be replaced by a cam track (integral with the knurled wheel) and a rod (integral with the hollow rod) perpendicular to the axis X1 as long as the rotational movement of the knurled wheel 40 is converted into a translational movement of the hollow rod 44.

Figure 13:
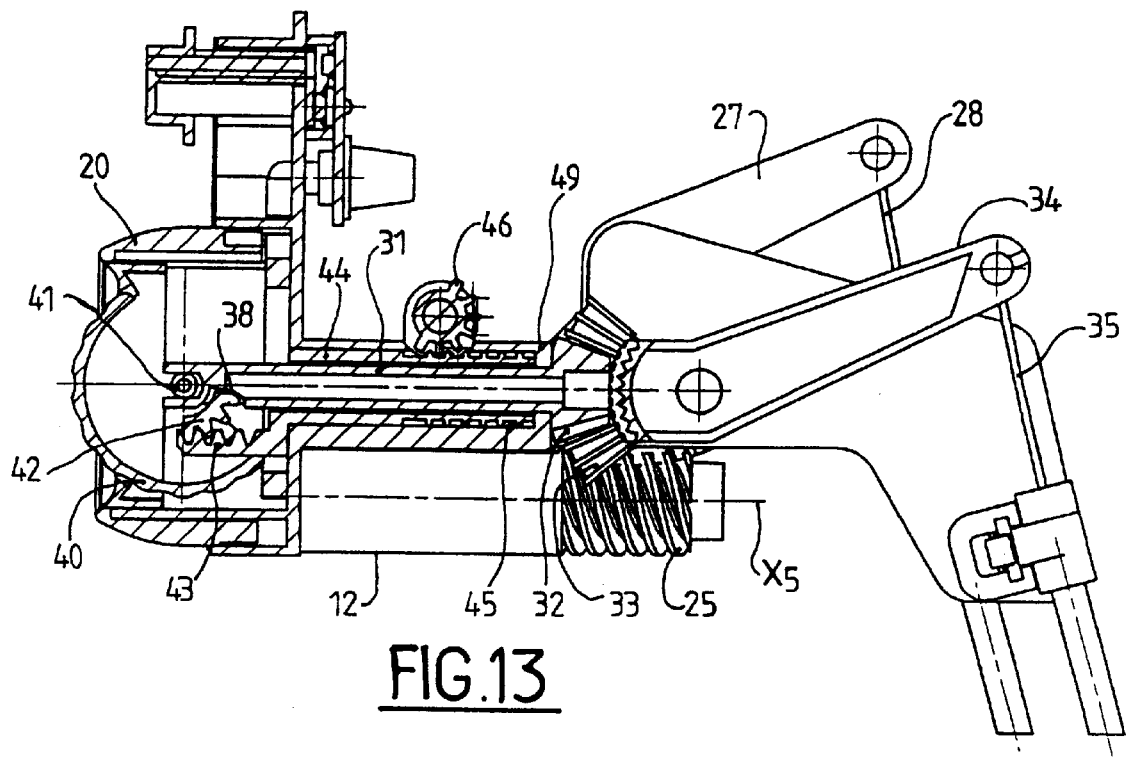
FIG. 13 is a sectional view (AA) of FIG. 12.
Figure 14:
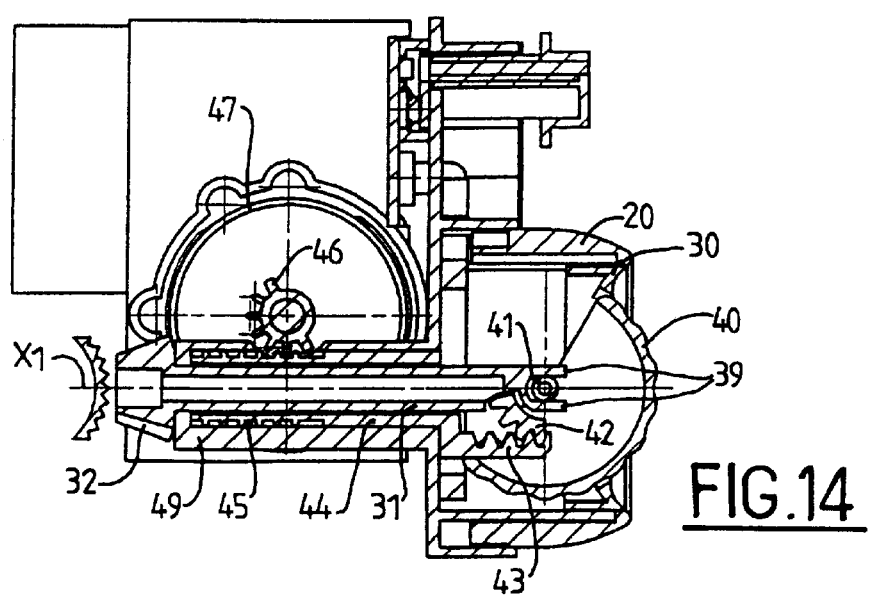
FIG. 14 is another sectional view (BB) of FIG. 12.

The hollow rod 44 is mounted about the first shaft 31 and can thus slide axially along it (see FIGS. 13 and 14 for example). Furthermore, as the rotation of the central knob 30 drives the rotation of the knurled wheel 40 about the first axis X1 (the knurled wheel being set into the slot 30a of the knob), it is arranged that the toothed wheel portion 42 of the knurled wheel 40 always remains in engagement with the rack gear 43, on the one hand in order to avoid the teeth of the rack gear and of the toothed wheel portion being offset and no longer coinciding and, on the other hand, in order to be able to drive the hollow rod in rotation when the central knob is turned. Thus, the knurled wheel 40 is equipped with two lateral abutments 48 parallel to the first axis X1 (see FIG. 2 in particular) arranged on either side of the rack gear. By turning the central knob, these abutments cause the rack gear 43 (and thus the hollow rod 44) to turn in one direction or the other about the axis X1, without that having any influence on the toothed wheel 46 of the lateral piece 47. This is because the teeth of the toothed wheel 46 slide in the grooves 45 parallel to the rod 44 when the hollow rod 44 turns, but that does not make it possible to drive the hollow rod in translation. Needless to say, the first shaft 31 turns at the same time as the hollow rod 44 about the axis X1.

It should be noted that it is not necessarily the knurled wheeled 40 which drives the rack gear 43 (and thus the hollow rod 44) in rotation about the axis X1 by way of the abutments 48, but the first shaft 31, directly. This is because it can be envisaged that the first shaft 31 might feature a cross-section which is no longer circular but, for example, square, rectangular or other (H-shaped), this cross-section interacting with an internal hollow shape of the hollow rod 44 in order to drive the latter while allowing its translation about the first shaft 31 when the knurled wheel is simply turned.

Figure 10:
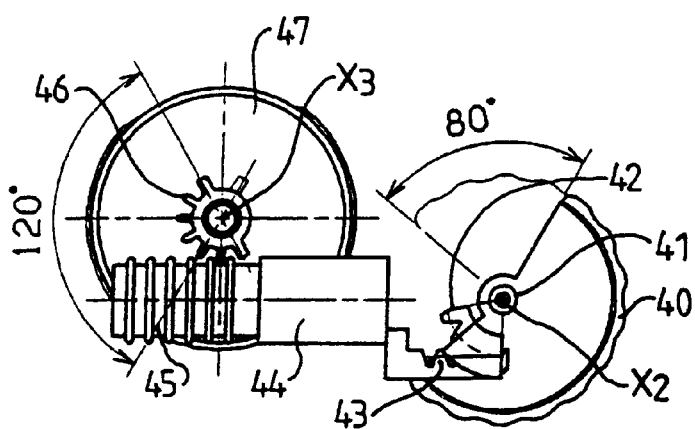
FIG. 10 is a right-hand-side view of FIG. 9, with one of the control means at the abutment.
Figure 11:
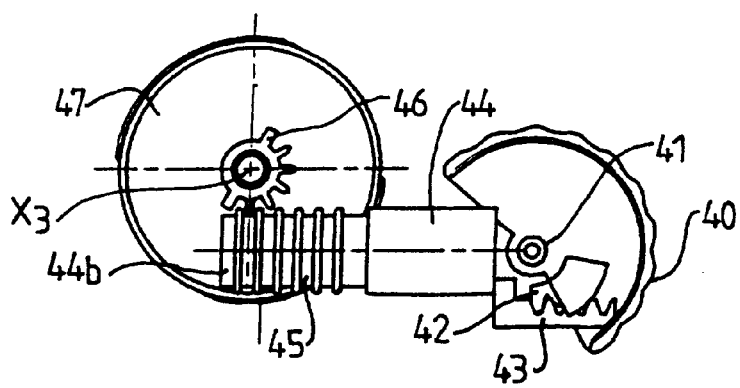
FIG. 11 is a right-hand-side view similar to FIG. 10, but with the control means at the opposite abutment.

In FIGS. 10 and 11, it can be seen how the knurled wheel 40, the rack gear 43 and the lateral piece 47 interact. By causing the knurled wheel 40 to turn by about 80°, it is possible to make the lateral piece 47 turn by about 120° about its rotational axis.

It will also be noted that the first shaft 31 features a housing 38 (FIG. 2) for the passage of the toothed wheel 41 of the knurled wheel 40.

The knurled wheel 40 is, needless to say, limited in rotation by abutments (not represented), for example in the form of claws bearing against corresponding walls of the central knob.

An axial abutment also exists between the hollow rod 44 and the conical gear 32 of the first shaft 31 by way of an axial barrel 49 of the support 15 (see FIGS. 13 and 14 in particular).

Figure 5:
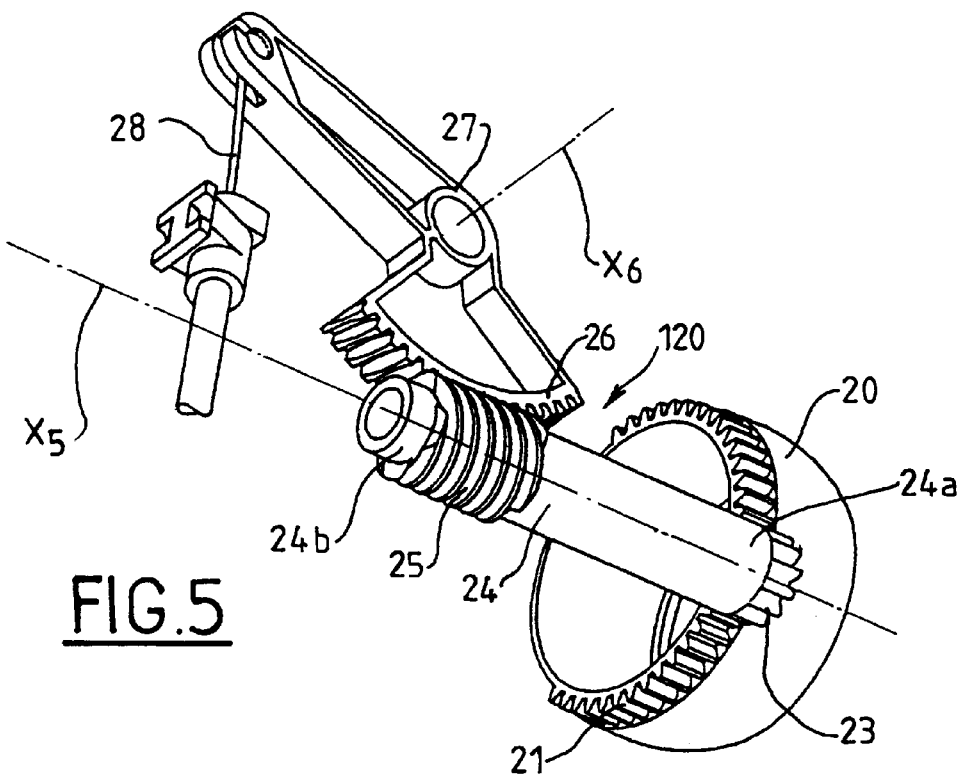
FIG. 5 is a detailed view in perspective of a control means.
Figure 6:
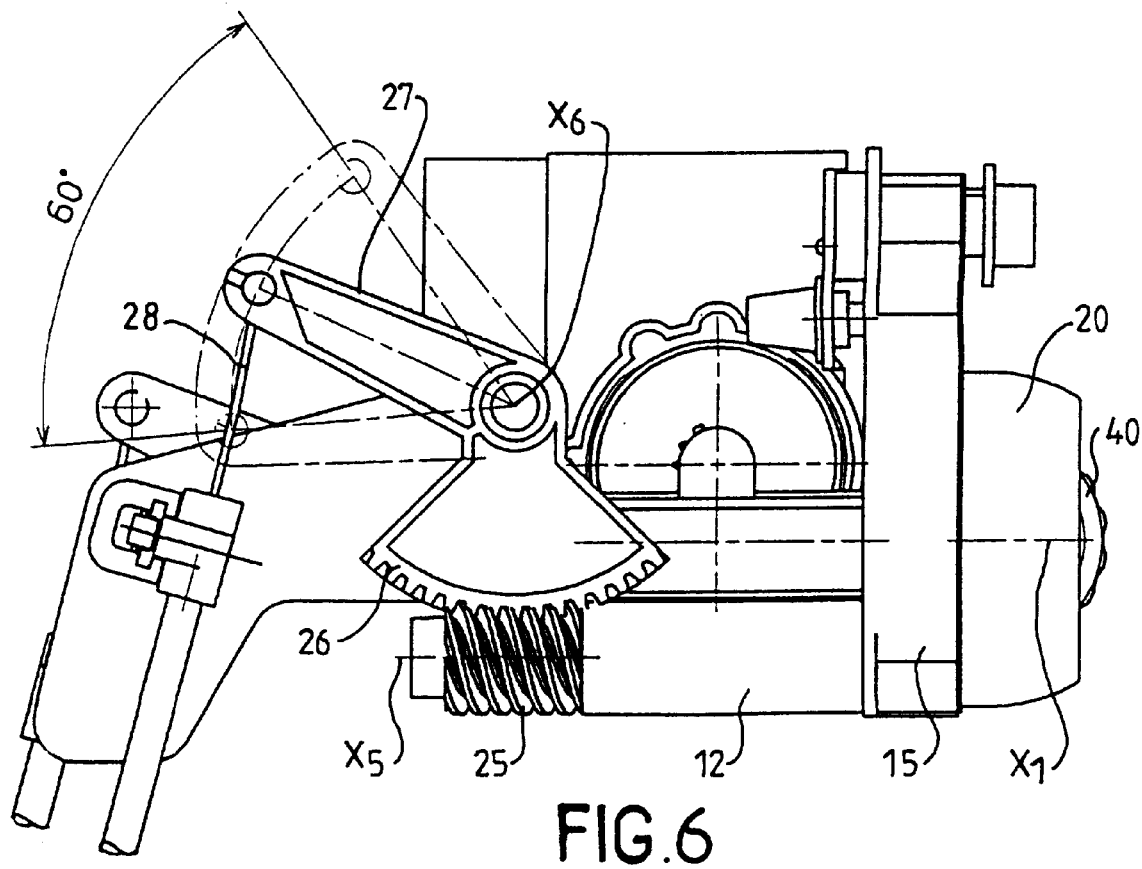
FIG. 6 is a left-hand-side view of FIG. 5.

FIG. 5 finally shows the ring 20 and its control member 120. This ring 20 can turn about a first axis X1 in such a way as to act on the spatial position of the airflow indicated by the symbols which are visible especially in FIG. 12. This ring 20 can turn typically over about 220° to 260° about its axis X1 so as to cover all the proposed positions of direction of the airflow (5. in the present case: demisting only, demisting+feet, feet only, feet+torso, and torso only). It features, externally and peripherally, a toothed-wheel portion 21 (invisible from the passenger compartment) with a straight pinion which is in engagement with a small, straight, complete pinion 23 situated at the end 24a of a second shaft 24 (preferably hollow in order to lighten the device) turning about a fifth rotational axis X5 parallel to the first axis X1. The shaft 24 is therefore off-axis with respect to the ring 20. At its opposite end 24b, the shaft 24 features a worm screw 26 which is in engagement with a straight toothed-wheel portion 26 of a second control lever 27, this toothed wheel 26 turning about a sixth rotational axis X6 perpendicular to the first axis. The second shaft 24 is mounted in a barrel 12 of a plastic support piece 15 (FIG. 6).

Thus, by turning the ring 20 in one direction or the other about the first axis X1, the second shaft 24 is made to turn (with a ratio of about 3 to 4) about the fifth axis X5. This shaft causes the toothed wheel 26 of the lever 27 to turn about the sixth axis X6, the lever then acting, via a rod linkage 28 provided for this purpose, for example on flaps (not represented). The lever 27 may describe a circular arc of about 60° between its two extreme positions corresponding to the extreme positions of the ring 20.

In any event, the majority of the rotational movements of the various pieces are limited by the configuration of the various gearings. It is for that reason, for example, that the ring 20 features only one toothed-wheel portion 21 which does not form its entire circumference. For the same reasons, the toothed wheel 26 of the second lever 27, or again the toothed wheel 42 of the knurled wheel 40 are incomplete.

This device is thus extremely compact and it complies fully with the criteria of aestheticism and of integration specific to the dashboards of modern vehicles. It is, furthermore, very easy to use and very reliable by reason of the use of kinematics relying on mechanical links of the pinion, worm-screw and rack-gear type.

It should, obviously, be understood, however, that these examples are given solely by way of illustration of the subject of the invention of which they do not in any way constitute a limitation.

Thus, where possible and worthwhile, provision can be made to replace the conical gears with straight gears, and vice versa.

Likewise, provision can be made for the gearing of the outer ring 20 to be arranged internally to this ring.

All the pieces are made from wear-resistant plastic, but it is possible to produce some of them from other materials, for example from composites or from metal such as aluminium or zamac.

What is claimed is:

1. Mechanical control device making it possible to act on control members (130, 140) of an airflow-distribution system (1) for a motor vehicle, characterised in that it comprises at least two separate control means (30, 40) with rotary movement acting respectively independently with respect to one another on the control members (130, 140), a first control means being mounted turning about a first rotational axis and carrying a second control means mounted turning about a second rotational axis which is inclined with respect to the first rotational axis.

2. Device (10) according to claim 1, characterised in that the second control means (40) is articulated onto the first control means (30) and turns about the second rotational axis X2 which is perpendicular to the first rotational axis X1.

3. Device (10) according to claim 1, characterised in that the first control means is a central knob (30) equipped with a slot (30a) and the second control means (40) is articulated in the said slot (30a).

4. Device (10) according to claim 1, characterised in that the second control means (40) features means (42) for transmitting a translational movement, by turning about the second rotational axis X2, along the first axis X1 to a rod (44) which features means (45) for converting this translational movement into a rotational movement about a third rotational axis X3 perpendicular to the first axis, this rotational movement being transmitted to a lateral control piece (47).

5. Device (10) according to claim 4, characterised in that the second control means is a knurled wheel (40) which internally features a straight-toothed-wheel portion (42) turning about the second rotational axis X2 so as to act on a straight-toothed rack gear (43) extending along the first axis X1 and integral with the rod (44), the said rod being equipped, furthermore, at the opposite end (44b) to the rack gear (43), with a succession of parallel grooves (45) which act axially like teeth in engagement with a toothed wheel (46) of the lateral control piece (47).

6. Device (10) according to claim 3, characterised in that the rotary central knob (30) is linked to one end (31a) of a first shaft (31) turning about the first rotational axis X1, this shaft (31) featuring means (32) for converting its rotational movement into another rotational movement about a fourth rotational axis X4 perpendicular to the first axis X1 so as to cause a first control lever (34) to turn.

7. Device (10) according to claim 6, characterised in that the first shaft (31) of the control knob (30) is equipped, at its opposite end (31b), with a conical gear (32) in engagement with a conical toothed-wheel portion (33) of the first control lever (34).

8. Device (10) according to claim 5, characterised in that the rod (44) is hollow and surrounds the first shaft (31) of the central knob (30) so as to be able to slide axially outside this shaft along the first rotational axis X1.

9. Device (10) according to claim 3, characterised in that the central knob (30) internally features two lugs (36, 37), spaced apart and parallel to the first rotational axis X1, these lugs (36, 37) each being traversed by a hole with its axis perpendicular to the first axis so as to accommodate an internal tubular part (41) of the knurled wheel (40) for the articulation of the latter about the second rotational axis X2.

10. Device (10) according to claim 3, characterised in that the central knob (30) internally features two lugs (36, 37), spaced apart and parallel to the first rotational axis X1, these lugs (36, 37) being equipped with protuberances with axis X2 interacting with a tubular part (41) of the knurled wheel (40) for the articulation of the latter about the second rotational axis X2.

11. Device (10) according to claim 9, characterised in that the first shaft (31) is equipped axially, at its end (31a) for linking to the central knob (30), with a notch (39) defining a link with the tubular part (41) of the knurled wheel (40).

12. Device according to claim 5, characterised in that the knurled wheel (40) also features means for rotationally driving the rod (44) by way of the rack gear (43).

13. Device according to claim 12, characterised in that these means consist of two parallel walls (48) extending along the first rotational axis X1 and situated in the immediate vicinity of the toothed wheel so as to surround the rack gear (43) on either side, acting as a lateral drive abutment.

14. Device (10) according to claim 1, characterised in that it further comprises a third control means (20) arranged around the first means (30) and movable in rotation about the first rotational axis X1.

15. Device according to claim 14, characterised in that the third control means consists of an outer ring (20) turning about the first rotational axis X1 and equipped with means (21) for causing a second shaft (24) to turn about a fifth rotational axis X5 parallel to the first axis X1, this shaft (24) featuring means (25) for converting its rotational movement into another rotational movement about a sixth rotational axis X6 perpendicular to the first axis XI so as to cause a second control lever (27) to turn.

16. Device according to claim 15, characterised in that the ring features a straight-pinion portion (21) arranged on its outer periphery and the teeth of which are in engagement with a straight gear (23) mounted at one end (24a) of the second shaft (24), the said shaft (24), at its other end (24b), featuring a worm screw (25) acting on a straight toothed-wheel portion (26) of the second control lever (27).

17. Device (10) according to claim 10, characterised in that the first control means (20) acts on the spatial location of the airflow.

18. Device (10) according to claim 1, characterised in that the second control means (30) acts on the temperature of the airflow.

19. Device (10) according to claim 1, characterised in that the third control means (40) acts on the power of the airflow.

20. Device (10) according to claim 1, characterised in that the control means (20, 30, 40) and the control members (120, 130, 140) are produced from plastic.

* * * * *